Figure 5:
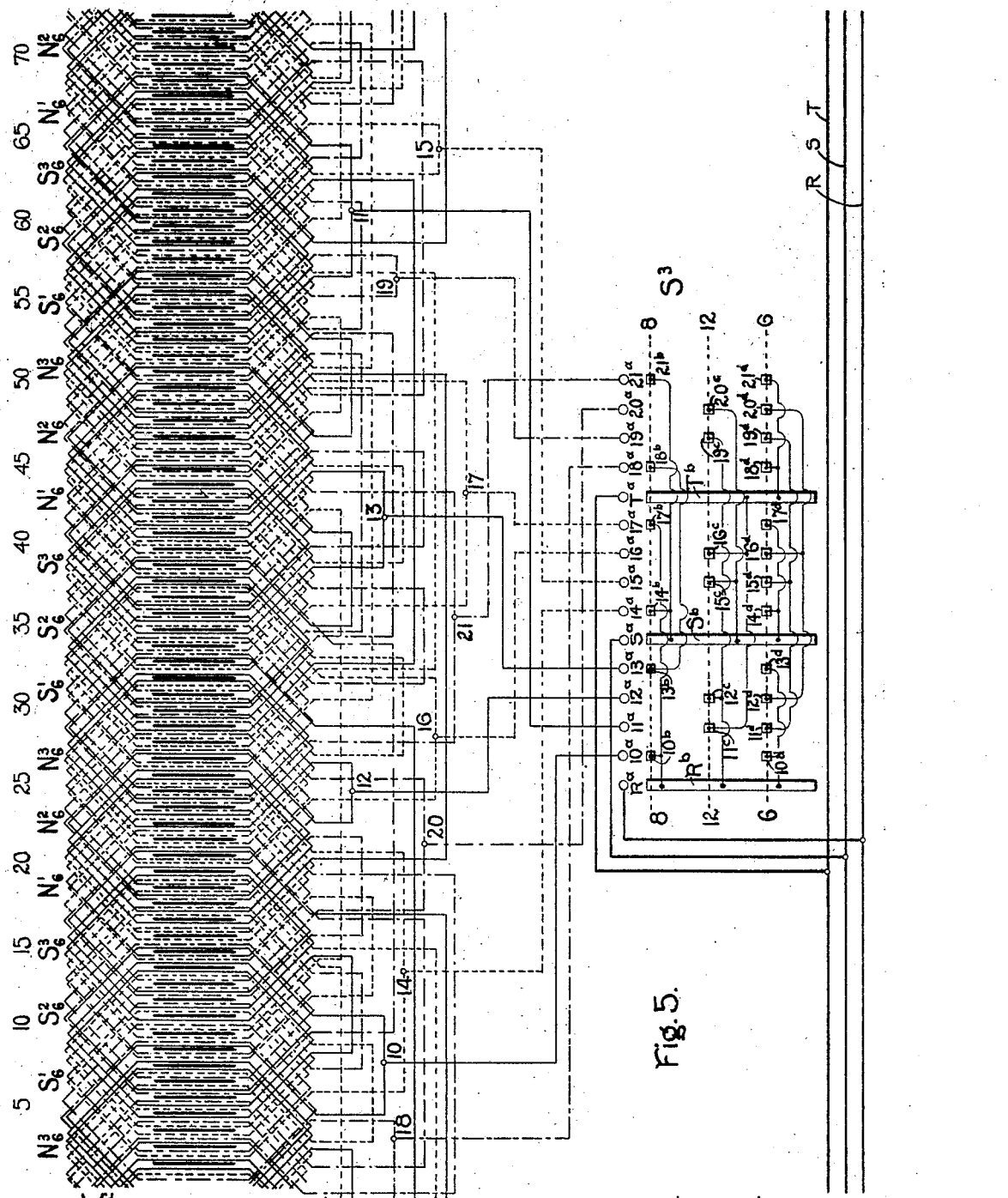

No. 841,609. PATENTED JAN. 15, 1907.
E. F. W. ALEXANDERSON.
MOTOR WINDING.
APPLICATION FILED JULY 23, 1903.
7 SHEETS—SHEET 1.
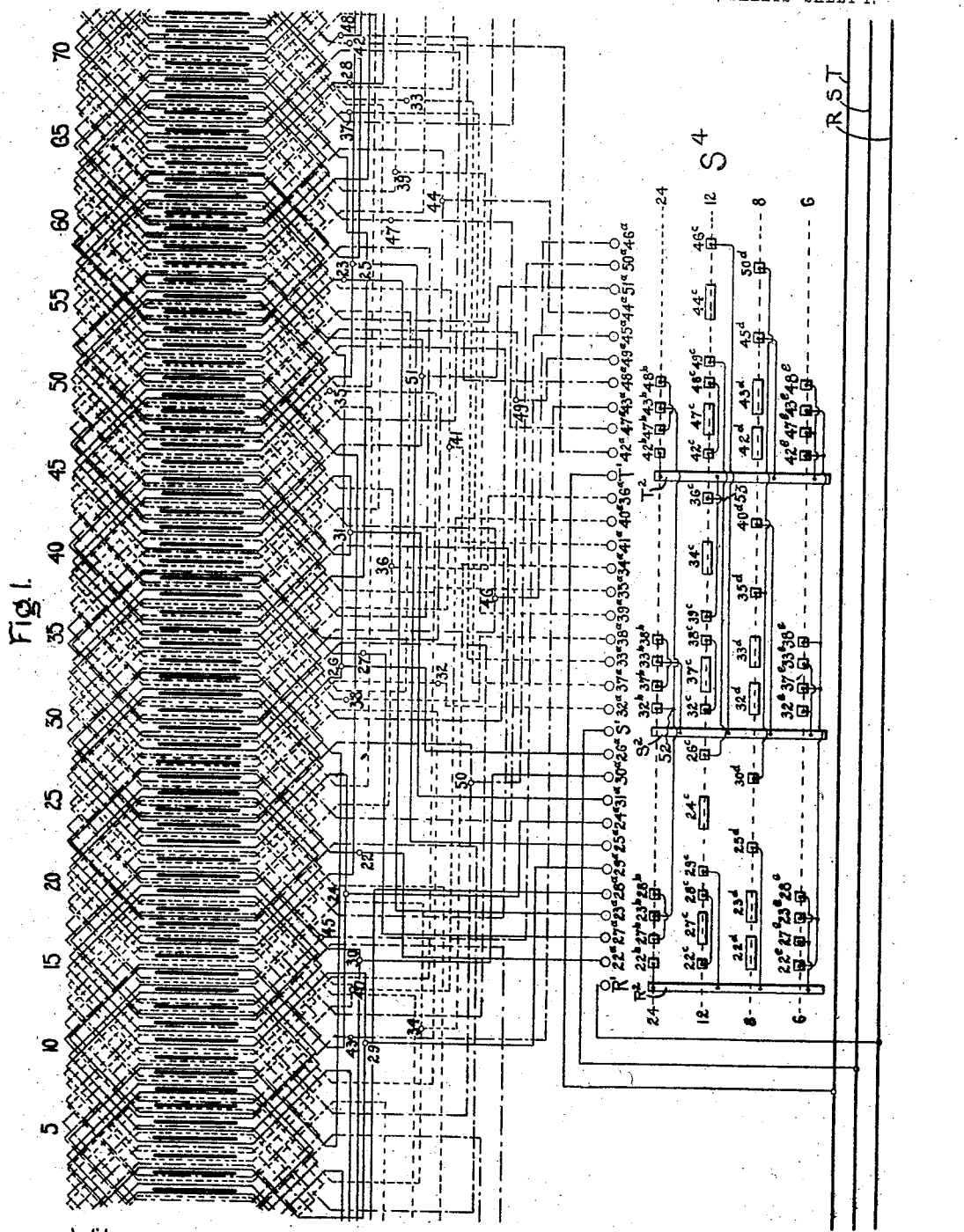
Witnesses:
John A. Ferguson
Helen Oxford
Inventor.
Ernst F. W. Alexanderson.
by Albert G. Davis
Att'y.

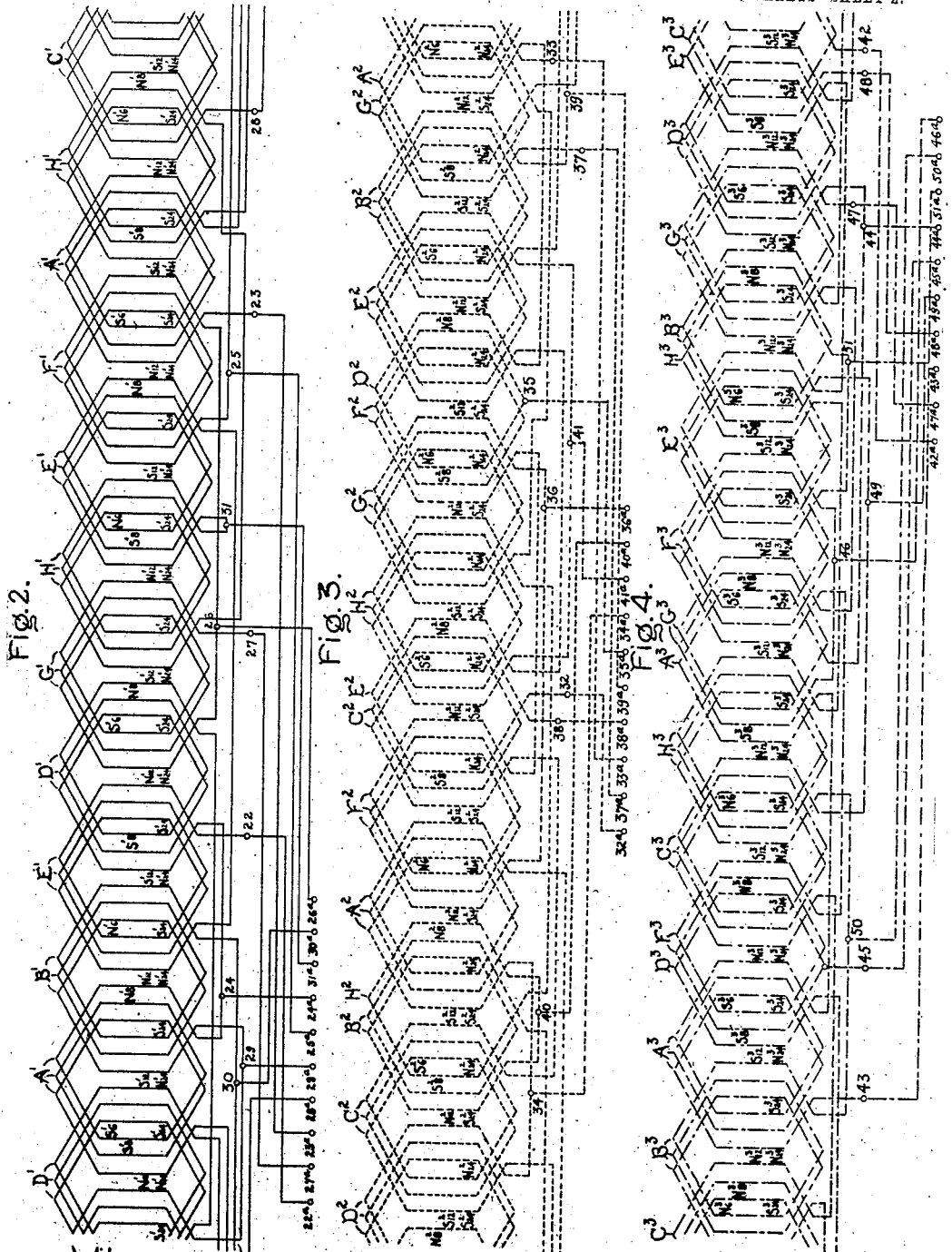

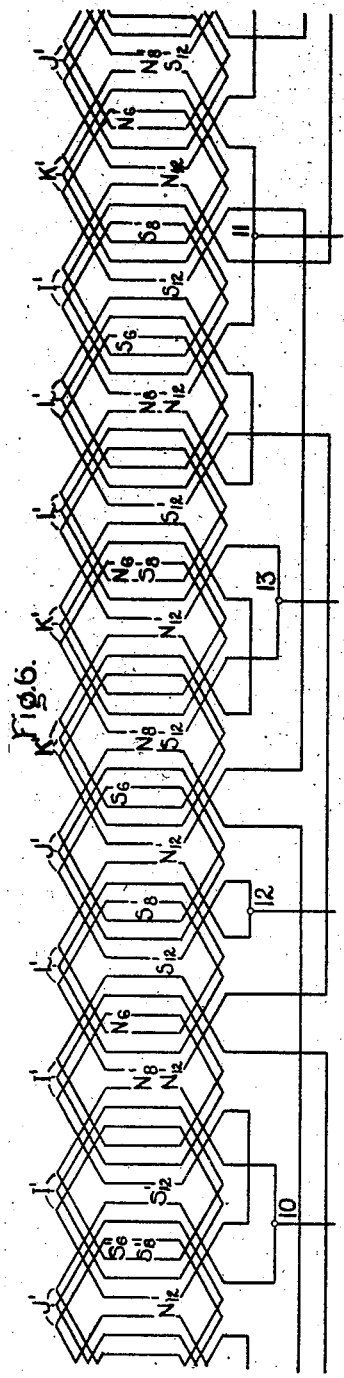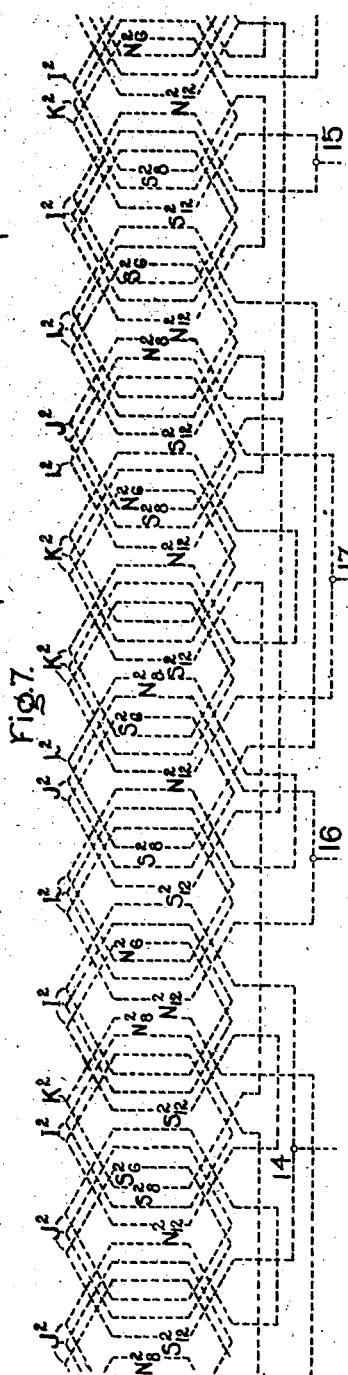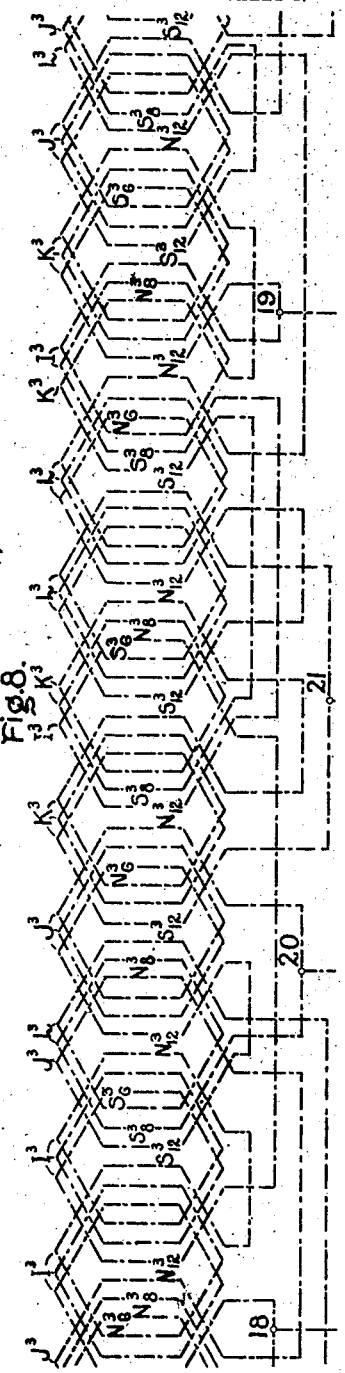

No. 841,609. PATENTED JAN. 15, 1907.
E. F. W. ALEXANDERSON.
MOTOR WINDING.
APPLICATION FILED JULY 23, 1903.

7 SHEETS—SHEET 5.

Witnesses:
John A. Ferguson
Helen Orford

Inventor:
Ernst F. W. Alexanderson
by Albert G. Davis
Att'y.

No. 841,609. PATENTED JAN. 15, 1907.
E. F. W. ALEXANDERSON.
MOTOR WINDING.
APPLICATION FILED JULY 23, 1903.
7 SHEETS—SHEET 6.
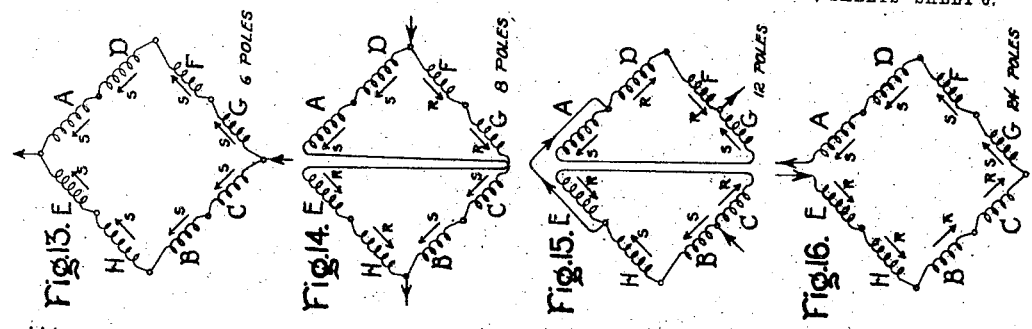
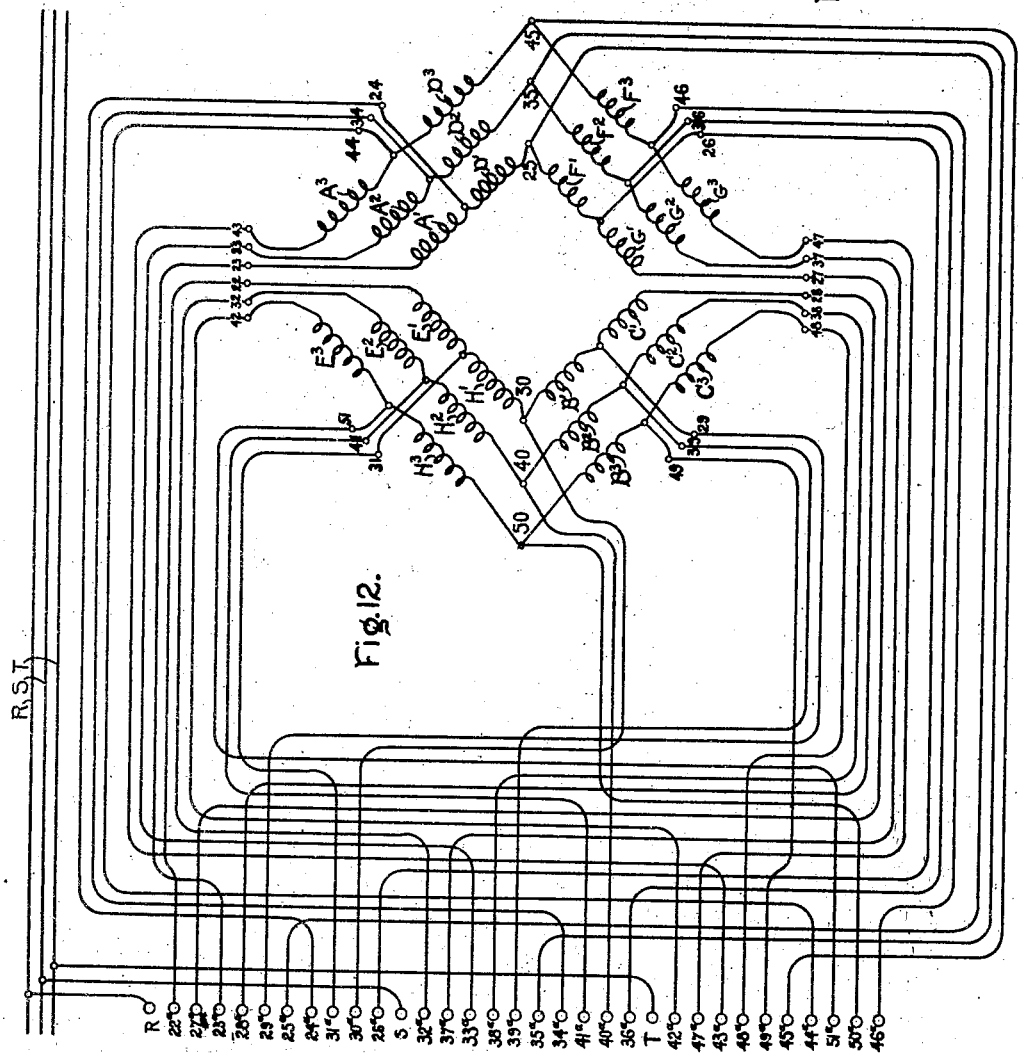
Witnesses:
John A. Ferguson.
Helen Oxford
Inventor.
Ernst F. W. Alexanderson
by Albert G. Davis
Att'y.

No. 841,609. PATENTED JAN. 15, 1907.
E. F. W. ALEXANDERSON.
MOTOR WINDING.
APPLICATION FILED JULY 23, 1903.
7 SHEETS—SHEET 7.
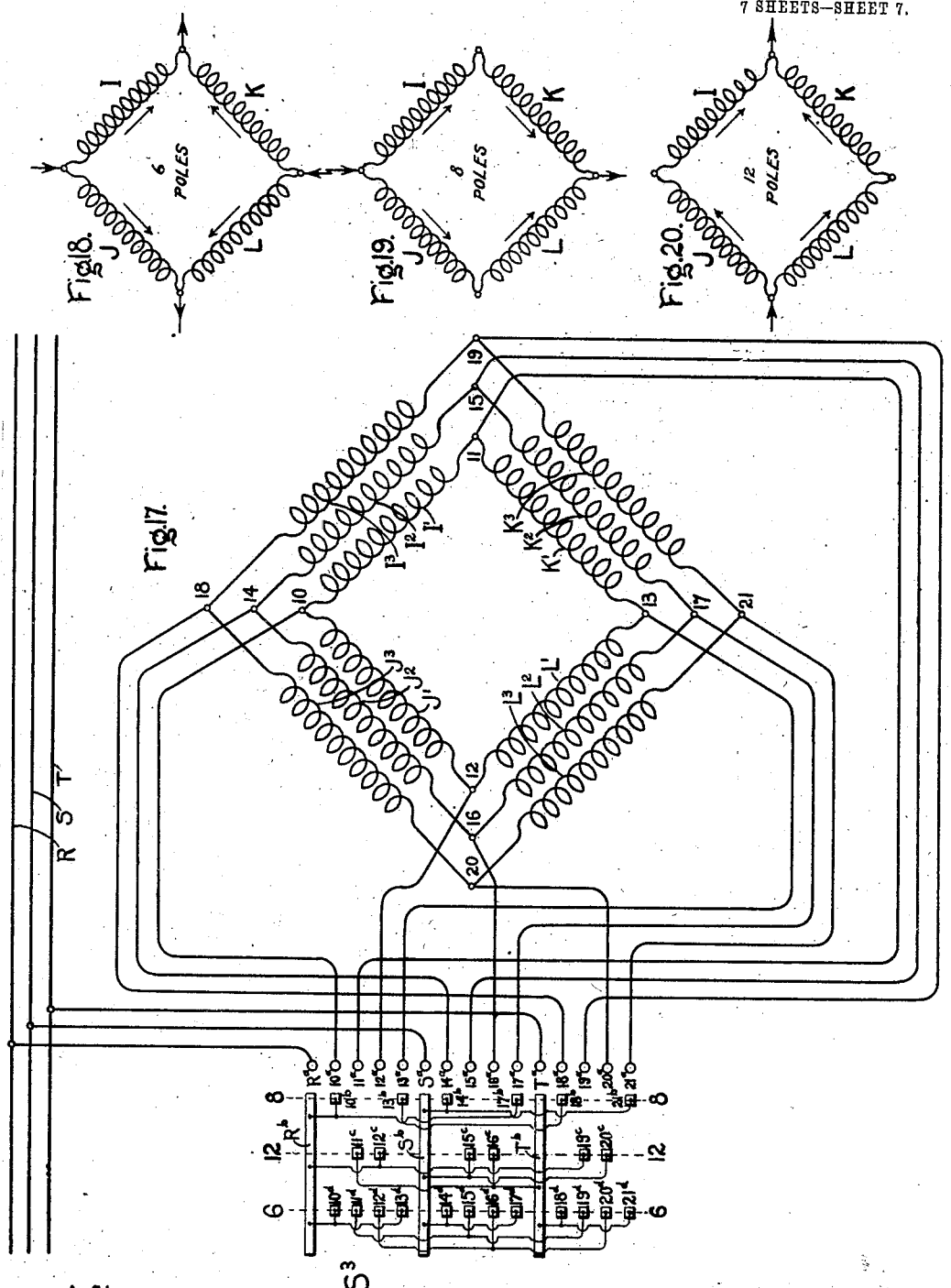
Witnesses:
John A. Ferguson.
Helen Orford
Inventor.
Ernst F. W. Alexanderson
by Albert G. Davis
Att'y.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

MOTOR-WINDING.

No. 841,609.      Specification of Letters Patent.      Patented Jan. 15, 1907.

Application filed July 23, 1903. Serial No. 166,676.

*To all whom it may concern:*

Be it known that I, ERNST F. W. ALEXANDERSON, a subject of the King of Sweden, residing at Schenectady, county of Schenectady, State of New York, have invented certain new and useful Improvements in Motor-Windings, of which the following is a specification.

The invention constituting the subject-matter of the present application relates to alternating-current motors provided with drum-windings having their conductors so arranged and connected that by simply varying the coupling of the same the number of poles and consequently the speed of rotation of the motor may be varied.

My invention embraces among other features, a novel arrangement of conductors of the winding and connections for the same, whereby the necessary changes in coupling may be made with a minimum of leads.

It has been proposed heretofore to vary the speed of the motor by changing its pole numbers by connecting the terminals of each pole-winding to a controlling-switch provided with suitable contacts for changing the direction of current-flow in certain windings for the different speeds. British Patent No. 12,151 of 1890 and United States Patent No. 606,407, granted June 28, 1898, to Dobbie, disclose means for doing this; but in both of these cases the large number of leads necessary renders the arrangement more or less objectionable. It is apparent that in like manner the conductors of a drum-winding might also be provided with individual leads connecting with one or more controlling-switches which could be manipulated to give the desired pole numbers; but such an arrangement would be open to the same objection. In order to overcome this objection, special windings have been proposed, among which may be mentioned those described in the following patents, which show special forms of drum-windings: Patent No. 771,246, granted to Henshaw October 4, 1904, which shows a two-phase motor provided with a winding arranged for two speeds in the ratio of two to one, Patent No. 725,415, granted April 14, 1903, to Dahlander and Lindstrom, which shows a three-phase motor having two speeds in the ratio of two to one, and Patent No. 606,056, granted June 21, 1898, to Hassler, which shows a two-phase motor having two speeds in the ratio of three to one. In each of these cases, however, nothing more has been attempted than to produce particular machines having particular speed ratios, and nothing in the nature of a generic type of winding broadly and generally applicable to multispeed motors for many different pole-numbers has been set out. On the other hand, I have not only invented a specific machine, but have also devised a species of winding which is capable of general application and which provides for any desired speed ratio with current of any number of phases.

If we consider any drum-winding with reference to the direction of current-flow in the several conductors, it will be apparent that at any given instant the current-flow in one half of the conductors will be in one direction and in the other half in the opposite direction—that is, in those portions of the conductors which lie within the slots of the core—and it will also be apparent that the number of poles will depend upon the number of points at which the direction of current-flow in adjacent conductors is opposite. If, then, the direction of current-flow in each conductor for a number of different speeds be considered, it will be seen that in certain conductors the direction of current-flow may be considered as the same for all the speeds, while in others the same changes in direction of current-flow take place in passing from one speed to another throughout all the speeds, considered in the same order. It then follows that those conductors in which the direction of current-flow is the same for all the speeds may be connected together into one circuit, while other circuits may be made up of those conductors in which the same changes in direction of current-flow take place in passing from one speed to another throughout all the speeds, as above indicated. These "circuits" or "groups," as I have termed them, may then be connected together in various orders to give the different speeds. This in substance produces a winding of my generic type. In order that a winding thus formed should be commercially practicable, it is essential that it should be formed of uniform or counterpart coils. Consequently after selecting the conductors in which the current varies in similar manner for the various speeds and which are therefore to be connected in one group, as described above, I pair off the conductors, choosing for all the pairs conductors that are displaced by an equal number of slots, and connect each pair of conductors directly in series to form a coil or one turn of a coil. All the coils are thus equal in width, and the winding arranged in accordance with my invention is composed of uniform or counterpart coils. Another point must be borne in mind in selecting pairs of conductors to connect in coils, and that is the number of speeds and the speed ratios desired. If the several coils are formed by connecting adjacent conductors of a group together so as to form the usual winding composed of a series of coils distinct from each other and not overlapping, only one speed ratio two to one, can be obtained. It is this connection that is employed in Patent No. 725,415, above referred to. By means of this connection uniform coils are obtained, which is not the case with the arrangement of Patent No. 606,056, also referred to above; but the arrangement of Patent No. 725,415 can give only two speeds, and those in the ratio of two to one. That this is true is evident from the following considerations: If two adjacent conductors of a phase are connected in the same coil, the relative direction of current-flow in the conductors is fixed. The only variation that can be obtained consequently consists in reversing alternate coils. This reversal of alternate coils is the control employed in Patent No. 725,415 and gives the only speed ratios attainable with the winding shown. In order to get a greater number of speeds or a different speed ratio, it is essential that the direction of current in a conductor should be reversible relatively to the current in the conductors on each side of it, or, in other words, at least three adjacent conductors must be connected in independent coils. To accomplish this, while at the same time retaining uniform coils, I have devised a winding in which each coil is overlapped by at least one similar coil on each side. This gives an arrangement for each phase which resembles the usual polyphase winding, and on account of the overlapping or interlinking may aptly be termed a "chain" winding. Where each coil is overlapped by one coil on each side, four adjacent conductors are in independent coils, and by properly reversing the direction of circuit-flow through the several conductors the speed ratios of one to two to three to four may be obtained. By letting each coil be overlapped by more than one coil on each side more than four adjacent conductors may be connected in different coils and other speed ratios may be obtained.

My invention consequently consists in a novel winding for alternating-current motors in which the winding or each phase of the winding for a polyphase motor consists of a plurality of uniform overlapping coils with means for varying the relative directions of current-flow in the coils. More specifically considered, my invention consists of a winding as above described, the coils being connected permanently in groups and the groups being connected permanently together, with means for varying the connections from the groups to the source of current.

A further feature of my invention relates specifically to three-phase multispeed motors. In order to secure the greatest flexibility in arranging the winding for different pole-numbers, it is often desirable to be able to use any slot for any phase. The standard winding ordinarily employed in alternating-current motors is arranged with two coils in each slot, and these two coils may obviously be of the same or of different phases; but such a winding does not suffice to give the complete distribution of each phase of a three-phase motor that may sometimes be desirable.

One feature of my invention consists in arranging three coils in each slot and connecting the three coils in different phases to form a completely-distributed three-phase winding.

My invention further embraces certain novel connections of the groups or circuits above referred to, by which three and four speeds in a three-phase motor are obtained with a maximum of four and ten leads per phase, respectively.

Other features and advantages of my invention will be apparent from the following description, taken in connection with the accompanying drawings, which illustrate the primary winding of a four-speed three-phase motor constructed and arranged to be coupled so as to give six, eight, twelve, and twenty-four poles, and thereby speeds proportional to one, two, three, and four.

Figure 9:
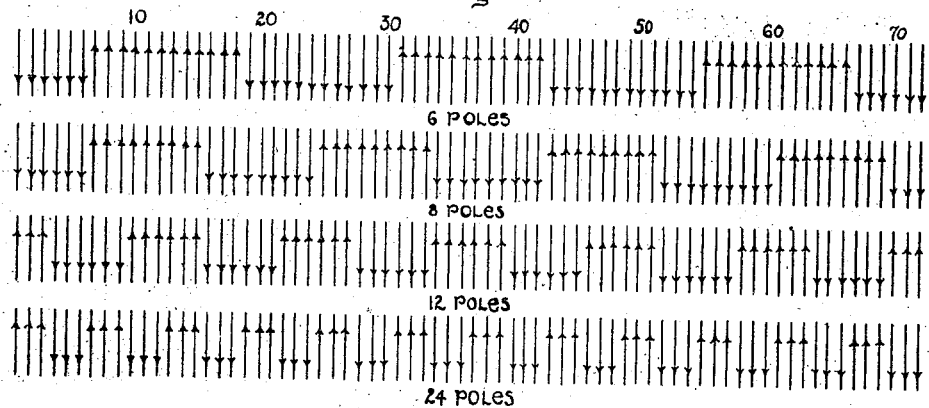
Figure 10:
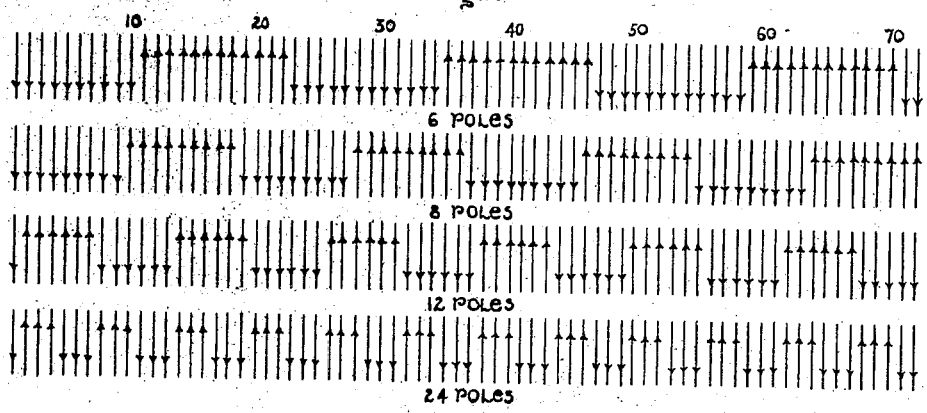
Figure 11:
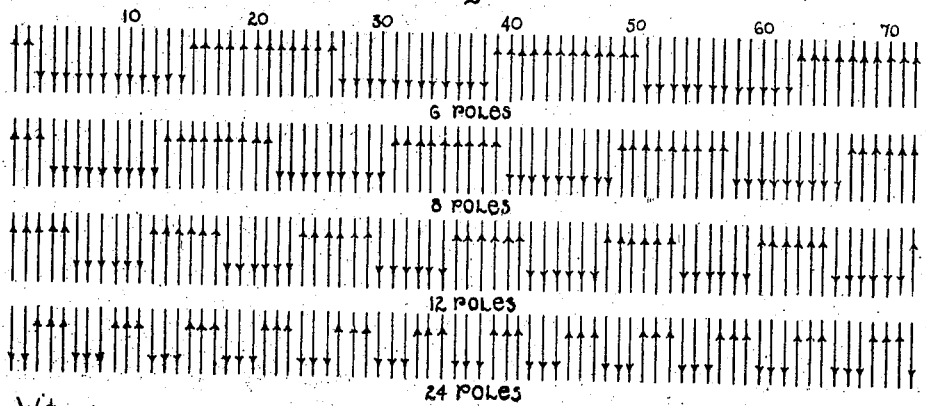

In said drawings, Figure 1 is a diagram of the complete three-phase windings and connections of the primary member of said four-speed motor. Figs. 2, 3, and 4 are similar diagrams of the first, second, and third phase windings which are shown assembled in Fig. 1. Fig. 5 is a diagram similar to Fig. 1, showing substantially the same windings provided with three-speed connections, which may be coupled to give six, eight, and twelve poles, and consequently speeds proportional to two, three, and four. Figs. 6, 7, and 8 are diagrams similar to Figs. 2, 3, and 4, illustrating the first, second, and third phase windings and connections, respectively, which are shown assembled in Fig. 5. Figs. 9, 10, and 11 are diagrams of the conductors of the first, second, and third phase windings, respectively, in which are illustrated the relative directions of instantaneous current-flow necessary to produce six, eight, twelve, and twenty-four poles. Fig. 12 is a simplified diagram of the windings and connections illustrated in Fig. 1 and indicates one way of connecting up the various groups into which the different phase-windings are divided so as to obtain four speeds. Figs. 13, 14, 15, and 16 are diagrams illustrating the relative direction of current-flow in the different groups into which each phase-winding is divided by which the four pole-numbers, six, eight, twelve, and twenty-four, respectively, are obtained. Fig. 17 is a diagram similar to Fig. 12, illustrating the manner of connecting the different groups of each phase-winding for the three pole-numbers, six, eight, and twelve; and Figs. 18, 19, and 20 are diagrams corresponding to Figs. 13 to 16, inclusive, illustrating the relative direction of current-flow in the different groups of each phase-winding by which the three pole numbers, six, eight, and twelve, respectively, are obtained.

In the accompanying drawings the magnetic core, which is shown developed upon a plane surface, is provided with seventy-two slots, which are indicated in the various figures by the rows of numerals above the windings, and in Figs. 1 and 5 the teeth of the core are indicated by a row of vertical lines. The windings of the three phases are arranged on the core so that in each slot there is one conductor of each phase, and these conductors are arranged one above the other in that order which will give equal reactances in the different phase-windings, the relative arrangement being shown in Figs. 1 and 5, where the conductor on the left is the uppermost conductor and that on the right the lowermost. For example, in slot 2 the conductor of the third-phase winding, which is shown in dot-and-dash lines, being located at the right, occupies the lowermost position in the slot, while the conductor of the first-phase winding (indicated by full lines) occupies the uppermost position. Throughout the drawings the first-phase winding is shown in full lines and the second and third phase windings in dotted and dot-and-dash lines, respectively. Placing three coils in each slot and connecting them in different phases gives the most complete distribution possible of each phase, and consequently the maximum flexibility in connecting the winding properly for different numbers of poles.

The arrangement of the different phase-windings which go to make up the complete primary winding is best illustrated in Figs. 2, 3, 4, 6, 7, and 8, and each winding may be generally described as consisting of a number of sets of coils which are so disposed upon the core that each set embraces the left-hand conductors of the set upon its right and the right-hand conductors of the set upon its left. For example, if we consider in Figs. 2 and 6 that set including the coils which extend up through slots 4, 5, and 6 and down through slots 13, 14, and 15, respectively, it will be seen that between the conductors in the slots 6 and 13 are located the conductors 7, 8, and 9, which are the right-hand conductors of the set of coils which extends toward the left, and conductors 10, 11, and 12, which are the left-hand conductors of a set of coils which extends toward the right. This chain-like arrangement of sets of coils extends through the winding of each phase, and by means of it I am able to obtain the necessary pole-numbers by varying the connections of the coils.

By connecting up the three-phase windings so that the directions of current-flow in the various conductors at any assumed instant will be as indicated by the arrows in Figs. 9, 10, and 11, six, eight, twelve, and twenty-four poles per phase may be obtained. Of these figures, Fig. 9 shows the necessary directions of current-flow by which these pole-numbers may be obtained in the first-phase winding, Fig. 10 the second, and Fig. 11 the third, and in each figure the first row of arrows indicates the directions which give six poles; the second row, eight; the third, twelve, and the fourth, twenty-four. It will be noted by the above arrangement that a proper rotating field is obtained, the poles produced by the second-phase winding being displaced one-third the polar pitch from the corresponding poles produced by the first winding and the poles produced by the first-phase winding being displaced one-third the polar pitch from those produced by the second-phase winding. This is clearly indicated for the six poles in Fig. 5, where the letters "N" and "S" indicate the centers of north and south poles, respectively, and the exponents 1, 2, and 3 indicate the particular phase-winding which is instrumental in producing the particular pole and the subscript 6 the number of poles per phase.

In a winding arranged in accordance with my invention, so as to give the requisite direction of current-flow to produce the desired pole-numbers, the conductors are separated into a plurality of groups, and then the groups are connected in different orders, each of the groups consisting of all those conductors in which the same condition of current-flow exists through all the changes of coupling. Considering the diagrams in Figs. 9, 10, and 11, if it is desired to connect up the conductors of the winding so as to give six, eight, twelve, and twenty-four poles per phase the conductors of each phase may be separated into groups, as follows: first, all those conductors in which the direction of current-flow is the same for all the pole-numbers; second, all those in which the direction of current-flow is the same for twenty-four poles and the opposite for six, eight, and twelve; third, all those conductors in which the direction of current-flow is the same for six and eight and the opposite for twelve and twenty-four; fourth, all those in which the direction of current-flow is in one direction for twelve poles and opposite for six, eight, and twenty-four; fifth, those in which it is in one direction for six poles and opposite for eight, twelve, and twenty-four; sixth, those in which it is in one direction for six and twenty-four and opposite for eight and twelve; seventh, those in which it is in one direction for eight poles and opposite for six, twelve, and twenty-four, and, eighth, those in which it is in one direction for six and twelve poles and opposite for eight and twenty-four. Considering each of the phase-windings separately, in the case of the first-phase winding the first of the aforesaid groups includes those conductors in slots 4, 5, 6, 13, 14, 15, 52, 53, 54, 61, 62, and 63; the second, those in slots 10, 11, 12, 19, 20, and 21; the third, those in slots 1, 2, 3, 64, 65, and 66; the fourth, those in slots 7, 8, 9, 22, 23, 24, 31, 32, 33, 70, 71, and 72; the fifth, those in slots 16, 17, 18, 25, 26, 27, 40, 41, 42, 49, 50, and 51; the sixth, those in slots 46, 47, 48, 55, 56, and 57; the seventh, those in slots 28, 29, 30, 37, 38, and 39, and the eighth those in slots 34, 35, 36, 43, 44, 45, 58, 59, 60, 67, 68, and 69. Similarly for the second-phase winding the first group includes those conductors in slots 1, 14, 15, 16, 23, 24, 25, and 64; the second, those in slots 8, 9, 17, 18, 56, 57, 58, 65, 66, and 67; the third, those in slots 2, 3, 4, 11, 12, 13, 26, 27, 35, and 36; the fourth, those in slots 5, 6, 7, 46, 55, 68, 69, and 70; the fifth, those in slots 28, 37, 50, 51, 52, 59, 60, and 61; the sixth, those in slots 20, 21, 22, 29, 30, 31, 44, 45, 53, and 54; the seventh, those in slots 38, 39, 40, 47, 48, 49, 62, 63, 71, and 72; the eighth, those in slots 10, 19, 32, 33, 34, 41, 42, and 43. In a similar manner the conductors of the third-phase winding may be divided into corresponding groups, as follows: the first group including those conductors in slots 6, 7, 8, 15, 16, 17, 30, and 39; the second, those in slots 1, 2, 9, 10, 11, 49, 50, 58, 59, and 72; the third, those in slots 4, 5, 18, 19, 20, 27, 28, 29, 67, and 68; the fourth, those in slots 12, 21, 60, 61, 62, 69, 70, and 71; the fifth, those in slots 3, 42, 43, 44, 51, 52, 53, and 66; the sixth, those in slots 13, 14, 22, 23, 36, 37, 38, 45, 46. and 47; the seventh, those in slots 31, 32, 40, 41, 54, 55, 56, 63, 64, and 65, and the eighth those in slots 24, 25, 26, 33, 34, 35, 48, and 57. When the conductors of each phase winding are thus separated into groups, the conductors of each group are connected together. These connected groups are designated by the letters A, B, C, D, E, F, G, and H, with exponents "1," "2," and "3" to indicate the phase-winding of which each particular groups form a part, the first of the above groups being designated A, the second B, and so on through the eight groups. In the case of group A', which is the first group of the first-phase winding and which includes the conductors in slots 4, 5, 6, 13, 14, 15, 52, 53, 54, 61, 62, and 63, the conductors are connected together in the order illustrated in Fig. 2. The path formed by this connection may be traced as follows: Beginning with point 24 it extends up through slot 15, down through 6, up through 14, down through 5, up through 13, down through 4, thence up through 63, down through 54, up through 62, down through 53, up through 61, down through 52, to the point 23. It should be noted at this point that this particular connection of the conductors is not essential, but that they might be connected in any other desired order, providing only that when connected the direction of current-flow at any assumed instant shall be down through slots 4, 5, 6, 52, 53, and 54 and up through slots 13, 14, 15, 61, 62, and 63. In a similar manner the other groups of the first-phase winding and all the groups of the second and third phase windings may be traced. Continuing with the group of the first-phase winding, group B' extends between points 29 and 30, group C' between points 28 and 29, group D' between points 24 and 25, group E' between points 22 and 31, group F' between points 25 and 26, group G' between points 26 and 27, group H' between points 30 and 31. In the case of the second-phase winding group $A^2$ extends between points 33 and 34, $B^2$ between points 39 and 40, $C^2$ between points 38 and 39, $D^2$ between points 34 and 35, $E^2$ between points 32 and 41, $F^2$ between points 35 and 36, $G^2$ between points 36 and 37, $H^2$ between points 40 and 41. Similarly, for the third-phase winding group $A^3$ extends between points 43 and 44, $B^3$ between points 49 and 50, $C^3$ between points 48 and 49, $D^3$ between points 44 and 45, $E^3$ between points 42 and 51, $F^3$ between points 45 and 46, $G^3$ between points 46 and 47, $H^3$ between points 50 and 51.

Having formed the above groups, it then remains to connect them to some suitable controlling-switch to give the proper change in direction of current-flow in the different groups for the different speeds. This may be done in any case by connecting the terminals of each group to a controlling-switch of a type shown in a patent to Dobbie, previously referred to, and one which may be readily designed for any given case; but in the present instance such a switch would necessitate sixteen leads per phase, and in order to cut down this number of leads the coils are connected together in two branches each provided with end terminals and three intermediate terminals, as clearly illustrated in Fig. 12, and said terminals are connected by suitable leads with a controlling-switch provided with contact-segments arranged to give the directions of current-flow in the various groups indicated in Figs. 13, 14, 15, and 16. In these figures the letters A, B, C, D, E, F, G, and H are used to refer generally to the groups which in other figures are provided with exponents to indicate the specific phase windings of which each forms a part. Similarly, the conductors of the windings may be grouped so as to give any number of speeds with a minimum number of leads. For example, the same winding which I have described above may be provided with connections for three speeds, and in such case only four leads per phase are necessary. If, for instance, the pole-numbers 6, 8, and 12 be selected, the steps will be as follows: Considering only the first three rows of Figs. 9, 10, and 11, since the twenty-four-pole connection is not wanted, four groups (designated generally by the letters I, J, K, and L) will be obtained. The first group I of each phase winding will comprise all those conductors in which the direction of current-flow is the same for all pole-numbers; the second, J, those in which the direction of current-flow is in one direction for twelve poles and opposite for six and eight poles; the third, K, those in which it is in one direction for eight poles and opposite for six and twelve poles, and the fourth, L, those in which it is in one direction for six poles and opposite for eight and twelve poles.

Considering now the groups of the first phase, the first group I' comprises the conductors in slots 4, 5, 6, 10, 11, 12, 13, 14, 15, 19, 20, 21, 52, 53, 54, 61, 62, and 63; the second group, J', those conductors in slots 1, 2, 3, 7, 8, 9, 22, 23, 24, 31, 32, 33, 64, 65, 66, 70, 71, and 72; the third group, K', those conductors in slots 28, 29, 30, 34, 35, 36, 37, 38, 39, 43, 44, 45, 58, 59, 60, 67, 68, and 69, and the fourth group, L', those in slots 16, 17, 18, 25, 26, 27, 40, 41, 42, 46, 47, 48, 49, 50, 51, 55, 56, and 57. In a similar manner groups $I^2$ $J^2$ $K^2$ $L^2$ and $I^3$ $J^3$ $K^3$ $L^3$ are formed for the second and third phase windings, respectively. When the conductors of each phase winding are thus separated in groups, the conductors of each group are connected together as in the previous case, and, as there pointed out, the connections for any particular group may be made in various ways; but I have preferred to connect them up as illustrated in Figs. 6, 7, and 8. If we consider one of these groups, as group I', it will be seen that it extends between the points 10 and 11 throughout the various slots as follows: up through 15, down through 6, up through 14, down through 5, up through 13, down through 4, thence up through 10, down through 19, up through 11, down through 20, up through 12, down through 21, thence up through 63, down through 54, up through 62, down through 53, up through 61, and down through 52, thence to point 11. In a similar manner the other groups of the first-phase winding may be traced as follows: the group K' between points 1 and 13, L' between points 12 and 13, J' between points 10 and 12. In the case of the second-phase winding the group $I^2$ may be traced between the points 14 and 15, $J^2$ between the points 14 and 16, $K^2$ between the points 15 and 17, $L^2$ between the points 16 and 17, and in the case of the third-phase winding group $I^3$ may be traced between the points 18 and 19, $J^3$ between the points 18 and 20, $K^3$ between the points 19 and 21, and $L^3$ between the points 20 and 21. Having arranged the groups of the windings for the three-pole numbers, it only remains, as before, to connect them together in such a manner that the necessary changes in direction of current-flow may be obtained by suitable changes in the coupling, and, as before pointed out, this may be accomplished by providing each group with two terminals and connecting all of said terminals to a suitable controller. In the present instance, however, the necessary changes may also be obtained and with fewer leads by connecting the groups of each phase winding in a closed circuit, as indicated in Figs. 17, 18, 19, and 20, and connecting the points between the groups of each phase to a controller $S^3$.

Referring again to the four-speed connections, as shown in Figs. 12 to 16, inclusive, the groups of each phase winding are arranged in two branches each of which is provided with two end terminals and three intermediate terminals. Of the two branches of the first-phase winding one branch includes the groups E' H' B' C' and the other the groups A' D' F' G', the former being provided with end terminals 22 and 28 and intermediate terminals 29, 30, and 31 and the latter with end terminals 23 and 27 and intermediate terminals 24, 25, and 26. Similarly, the groups of the second-phase winding are connected so as to form two branches, one of which includes $E^2$ $H^2$ $B^2$ $C^2$ and the other the groups $A^2$ $D^2$ $F^2$ $G^2$, the former being provided with end terminals 32 and 38 and intermediate terminals 39, 40, and 41 and the latter with end terminals 33 and 37 and intermediate terminals 34, 35, and 36. The third-phase winding is also divided into two branches, one of which includes the groups $E^3$ $H^3$ $B^3$ $C^3$ and the other the groups $A^3$ $D^3$ $F^3$ $G^3$, the former being provided with terminals 42, 48, 49, 50, and 51 and the latter with terminals 43, 44, 45, 46, and 47. All of these terminals are electrically connected to the fixed fingers of a controller $S^4$, each of the fingers being designated by the same numeral as the corresponding terminal, but being provided with an exponent "a." The rotatable member of the controller $S^4$ is provided with suitable segments which coöperate with said fixed fingers to produce the necessary changes in coupling. It is also provided with segments $R^2$ $S^2$ $T^2$, which are adapted to engage the contact-fingers $R'$ $S'$ $T'$, which are connected by suitable leads to supply-mains $R$, $S$, and $T$, respectively, extending from a suitable three-phase source of supply. The four positions of the rotatable member of the controller are indicated by the broken lines 24 24, 12 12, 8 8, and 6 6, said positions being those by which twenty-four, twelve, eight, and six poles, respectively, are obtained. In order to obtain twenty-four poles in the winding, the rotatable member of the controller is moved until the contact-segments in the line 24 24 are brought into engagement with the contact-fingers. In this position of the controller a Y connection is made, the three branches extending from the three supply-mains being traced as follows: One of these extends from the supply-main R to contact-finger $R'$, thence through contact-segments $R^2$, $22^b$, contact-finger $22^a$ to terminal 22, groups $E'$ $H'$ $B'$ $C'$ to terminal 28, contact-finger $28^a$, contact-segments $28^b$ $27^b$, contact-finger $27^a$, terminal 27, groups $G'$ $F'$ $D'$ $A'$, terminal 23, contact-finger $23^a$, contact-segment $23^b$ to the neutral point 52. A second branch extends from the supply-main S to contact-finger $S'$, thence through contact-segments $S^2$ $33^b$ $33^a$, groups $A^2$ $D^2$ $F^2$ $G^2$, terminal 37, contact-finger $37^a$, contact-segments $37^b$ $38^b$, contact-finger $38^a$, terminal 38, groups $C^2$ $B^2$ $H^2$ $E^2$, terminal 32, contact-finger $32^a$, contact-segment $32^b$ to neutral point 52. A third branch extends from the supply-main T to contact-finger $T'$, thence through contact-segments $T^2$ $42^b$, contact-finger $42^a$, terminal 42, groups $E^3$ $H^3$ $B^3$ $C^3$, terminal 48, contact-finger $48^a$, contact-segments $48^b$ $47^b$, contact-finger $47^a$, terminal 47, groups $G^3$ $F^3$ $D^3$ $A^3$, terminal 43, contact-finger $43^a$, contact-segment $43^b$ to neutral point 52. With this position of the controller it will be seen that the direction of current-flow through each of the phase-windings will be that indicated by Fig. 16 and that pole-centers will be produced for the three phases, as indicated by the characters $N'_{24}$ $S'_{24}$ in Fig. 2, $N^2_{24}$ $S^2_{24}$ in Fig. 3, and $N^3_{24}$ $S^3_{24}$ in Fig. 4. Similarly, if the controller is moved so that the contact-segments in the line 12 12 are brought into engagement with the contact-fingers a Y connection will also be formed whose three branches may be traced as follows: One branch, beginning with the supply-main R, extends to the contact-finger $R'$, thence through contact-segments $R^2$ $29^c$, contact-finger $29^a$ to terminal 29 between groups $C'$ and $B'$, there dividing, passing through one branch, including groups $B'$ $H'$, to the terminal 31 and another, including groups $C'$, terminal 28, contact-finger $28^a$, contact-segments $28^c$ $22^c$, contact-finger $22^a$, terminal 22, and group $E'$ to point 31, thence to contact-finger $31^a$, contact-segment $24^c$, contact-finger $24^a$ to terminal 24 between the groups $A'$ $D'$, there dividing and passing through two branches to the point 26, one including the groups $D'$ $F'$ and the other including group $A'$, terminal 23, contact-finger $23^a$, contact-segment $27^c$, contact-finger $27^a$, terminal 27, and group $G'$, thence to the contact-finger $26^a$, contact-segment $26^c$ to neutral point 53. A second branch extends from the supply-main S to contact-finger $S'$, thence through contact-segment $S^2$, contact-segment $46^c$, contact-finger $46^a$, thence to terminal 46 between the coils $G^3$ and $F^3$ of the third-phase winding, there dividing and passing through one branch, including groups $D^3$ and $F^3$, to the terminal 44, and through another branch, including group $G^3$, terminal 47, contact-finger $47^a$, contact-segment $47^c$, contact-finger $43^a$, terminal 43, and group $A^3$, to point 44, thence to contact-finger $44^a$, contact-segment $44^c$, contact-finger $51^a$ to terminal 51 between the groups $H^3$ and $E^3$ of the third-phase winding, there dividing and passing through one branch, including groups $H^3$ $B^3$, to terminal 49, and another branch, including group $E^3$, terminal 42, contact-finger $42^a$, contact-segments $42^c$ $48^c$, contact-finger $48^a$, terminal 48, and group $C^3$, to terminal 49, thence to contact-finger $49^a$, contact-segment $49^c$ to neutral point 53. A third branch extends from the supply-main T to contact-finger $T'$, thence through contact-segments $T^2$ $39^c$, contact-finger $39^a$ to terminal 39 between the groups $B^2$ and $C^2$ of the second-phase windings, there dividing and passing through one branch, including groups $B^2$ $H^2$, to the terminal 41, and through another, including group $C^2$, terminal 38, contact-finger $38^a$, contact-segments $38^c$ $32^c$, contact-finger $32^a$, terminal 32, and group $E^2$, to terminal 41, thence through contact-finger $41^a$, contact-segment $34^c$, contact-finger $34^a$ to terminal 34 between the groups $A^2$ and $D^2$ of the second-phase winding, there dividing, passing through one branch, including groups $D^2$ and $F^2$, to terminal 36 and through a branch, including group $A^2$, terminal 33, contact-finger $33^a$, contact-segment $37^c$, contact-finger $37^a$, terminal 37, group $G^2$, to point 36, thence to contact-finger $36^a$, contact-segment $36^c$ to neutral point 53. This position of the controller then gives the directions of current-flow indicated by Fig. 15 and produces pole-centers for the first, second, and third phase windings, as indicated in Figs. 2, 3, and 4, respectively, by the characters $N'_{12}$, $S'_{12}$, $N^2_{12}$, $S^2_{12}$, $N^3_{12}$, and $S^3_{12}$. In a similar manner the circuits may be traced for the eight and six pole positions of the controller, which would give the directions of current-flow indicated by Figs. 14 and 13, respectively, and produce pole-centers for the first, second, and third phase windings, as indicated in Figs. 2, 3, and 4, respectively, by the characters $N'_8$, $S'_8$, $N^2_8$, $S^2_8$, $N^3_8$, and $S^3_8$, which show the centers of eight poles, and $N'_6$, $S'_6$, $N^2_6$, $S^2_6$, $N^3_6$, and $S^3_6$, which show the centers of six poles, the former corresponding to Fig. 14 and the latter to Fig. 13.

Where the machine is designed for the three speeds in which the pole-numbers "6," "8," and "12" are used, the connections are much simplified, as clearly indicated in Fig. 17, and, as previously stated, only four leads per phase are necessary to produce the changes in coupling. In this arrangement the groups of each phase-winding are connected together so as to form a closed circuit, and suitable leads are carried out from terminals between the said groups. For example, in the case of the first-phase winding the groups I' J' K' L' are connected together into a closed circuit provided with terminals 10, 11, 12, and 13, from which suitable leads extend to the controller. In a similar manner leads extend from the terminals 14, 15, 16, 17, 18, 19, 20, and 21. Each of these leads connects with a contact-finger of a suitable controller $S^3$, and the fingers are designated with the same numerals as the corresponding terminals in the winding with which they connect, but are provided in each instance with an exponent "a." The rotatable member of the controller $S^3$ is provided with suitable contact-segments for engagement with these contact-fingers, so arranged as to give the necessary changes in the coupling of the different groups. Contact-segments $R^b$, $S^b$, and $T^b$ are also provided and are adapted to coöperate with contact-fingers $R^a$, $S^a$, and $T^a$, which are connected with mains R, S, and T, respectively, which lead from a suitable three-phase source of supply. The three positions of the controller are indicated by the lines 8 8, 12 12, and 6 6, and when the contacts through which these lines extend are in engagement with the contact-fingers the coupling is such as to give eight, twelve, and six poles, respectively. If the controller be moved so as to give eight poles in the winding, the contact-segments in the line 8 8 engage the contact-fingers and a delta connection is made. One branch of this connection extends from the supply-main R to the contact-finger $R^a$, thence through contact-segments $R^b$ $10^b$, contact-finger $10^a$, terminal 10, thence to terminal 13 through two branches, one of which includes groups J' L', the other I' K', thence through contact-fingers $13^a$, contact-segments $13^b$ $T^b$, contact-finger $T^a$ to supply-main T. The second extends from supply-main R, contact-finger $R^a$, contact-segments $R^b$ $17^b$, contact-finger $17^a$ to terminal 17, thence to terminal 14 through two branches, one of which includes groups $L^2$ $J^2$ and the other $K^2$ $I^2$, thence to contact-finger $14^a$, contact-segments $14^b$ $S^b$, contact-finger $S^a$ to main S. The third branch extends from the main S to contact-finger $S^a$, thence through contact-segments $S^b$ and $21^b$, contact-finger $21^a$ to terminal 21, thence to terminal 18 through two branches, one of which includes groups $L^3$ $J^3$ and the other $K^3$ $I^3$, thence to contact-finger $18^a$, contact-segments $18^b$ and $T^b$, contact-finger $T^a$ to supply-main T. The connection provided by this position of the controller gives the direction of current-flow in the several groups indicated in Fig. 19 and produces pole-centers as indicated by the characters $N'_8$, $S'_8$, $N^2_8$, $S^2_8$, $N^3_8$, and $S^3_8$ in Figs. 2, 3, 4, 6, 7, and 8.

In a similar manner the circuits may be traced for the six and twelve pole positions of the controller, and the directions of current-flow in the several groups will be that indicated in Figs. 18 and 20, respectively, and pole-centers will be produced as indicated by the characters $N'_6$, $S'_6$, $N^2_6$, $S^2_6$, $N^3_6$, $S^3_6$, $N'_{12}$, $S'_{12}$, $N^2_{12}$, $S^2_{12}$, $N^3_{12}$, and $S^3_{12}$ in Figs. 2, 3, 4, 6, 7, and 8.

I do not wish my invention to be limited to windings which are made up of coils of a plurality of turns, since it is clearly apparent that bar-windings and other windings composed of single-turn open coils might readily replace the coils of many turns shown in the drawings without changing the effect. It is also apparent that in some instances a single coil might take the place of a set of coils, so that where I use the expression "set of coils" it is intended to cover one or more coils. Furthermore, instead of each slot containing one conductor of each phase winding the conductors may be arranged in separate slots or otherwise so long as they are associated so as to have the same effect, and in order to bring out this fact in the claims I have used the expression "corresponding portion of the core," by which I mean that portion in which are located the conductors of the different phase windings which are associated so as to produce the same effect as if they were in the same slot. It is therefore clear that many modifications and alterations may be made without departing from the spirit of my invention, and I aim to cover by the terms of the appended claims all such modifications and alterations.

What I claim as new, and desire to secure by Letters Patent of the United States, is—

1. A phase-winding for a multispeed alternating-current motor, having its conductors connected so as to form a plurality of groups in a plurality of which the direction of current-flow is the same for a plurality of speeds of the motor, and means for changing the relative connections of the several groups for the different speeds.

2. A winding for a multispeed alternating-current motor, having its conductors connected so as to form a plurality of groups in each of which the direction of current-flow is the same for a plurality of speeds of the motor, and means for changing the relative connections of the several groups for the different speeds.

3. A winding for a multispeed alternating-current motor, having its conductors connected so as to form a plurality of groups in each of which the direction of current-flow is the same for a plurality of speeds of the motor and in some of which the current-flow is the same for the remaining speeds and in some of which it is reversed for the remaining speeds, and means for changing the relative connections of the groups for the different speeds.

4. A winding for a multispeed alternating-current motor, having its conductors connected so as to form three or more groups in one of which the direction of current-flow is the same for all speeds of the motor and in others of which the direction of current-flow is the same for some of the speeds and reversed for the remaining speeds, and means for changing the relative connections of the several groups for the different speeds.

5. A winding for a multispeed alternating-current motor, which consists of a plurality of sets of coils, each of which sets overlaps the adjoining set on either side so as to produce a chain-like arrangement of such sets, the conductors of said coils being connected so as to form a plurality of groups, and means for changing the relative connections of said groups for the different motor speeds.

6. In a multispeed alternating-current motor, the combination of a toothed or slotted core and a polyphase-winding thereon consisting of a distinct winding for each phase, each phase-winding consisting of a plurality of sets of coils each of which overlaps the adjoining set on either side so as to produce a chain-like arrangement of such sets, said phase-windings being so arranged that each slot or each corresponding portion of the core carries the same number of conductors of each phase-winding, leads extending from said windings, and means for changing the relative connections of said leads for the different motor speeds.

7. A multispeed alternating-current motor provided with primary drum-windings having their conductors connected together in groups and provided with terminals, the conductors of said windings being so associated with each other and said terminals that by changes of the coupling of said terminals the number of poles may be changed so as to give four speeds, and means for changing said coupling.

8. A multispeed alternating-current motor provided with primary drum-windings having their conductors connected in groups and provided with terminals, the conductors of said windings being so associated with each other and with said terminals that by changes of the coupling of said terminals the pole-numbers N, N/2, N/3 and N/4 are obtained, and means for changing said coupling.

9. A multispeed alternating-current motor provided with primary drum-windings having their conductors connected in groups and provided with terminals, the conductors of said windings being so associated with each other and with said terminals that by changes of the coupling of said terminals the pole-numbers N, N/2 and N/3 are obtained, and means for changing the coupling.

10. A multispeed alternating-current motor provided with primary drum-windings having their conductors connected in groups and provided with terminals, the conductors of said windings being so associated with each other and with said terminals that by changes of the coupling of said terminals the pole-numbers N, N/2 and N/4 are obtained, and means for changing said coupling.

11. A multispeed alternating-current motor provided with primary drum-windings having their conductors connected in groups and provided with terminals, the conductors of said windings being so associated with each other and with said terminals that by changes of the coupling of said terminals the pole-numbers N, N/3 and N/4 are obtained, and means for changing said coupling.

12. A multispeed alternating-current motor provided with primary drum-windings having their conductors connected in groups and provided with terminals, the conductors of said windings being so associated with each other and with said terminals that by changes of the coupling of said terminals the pole-numbers N/2, N/3 and N/4 are obtained, and means for changing said coupling.

13. A multispeed alternating-current motor provided with primary drum-windings having their conductors connected in groups and provided with terminals, the conductors of said windings being so associated with each other and with said terminals that by changes of the coupling of said terminals the pole-numbers N/2 and N/3 are obtained, and means for changing said coupling.

14. A multispeed alternating-current motor provided with primary drum-windings having their conductors connected in groups and provided with terminals, the conductors of said windings being so associated with each other and with said terminals that by changes of the coupling of said terminals the pole-numbers N/2 and N/4 are obtained, and means for changing said coupling.

15. A multispeed alternating-current motor provided with primary drum-windings having their conductors connected in groups and provided with terminals, the conductors of said windings being so associated with each other and with said terminals that by changes of the coupling of said terminals the pole-numbers N/3 and N/4 are obtained, and means for changing said coupling.

16. A two-speed alternating-current motor provided with primary drum-windings having their conductors connected in groups and provided with terminals, the conductors of said windings being so associated with each other and with said terminals that by changes of the coupling of said terminals the pole-numbers N and N/4 are obtained, and means for changing said coupling.

17. A two-speed three-phase alternating-current motor provided with primary drum-windings having their conductors connected in groups and provided with terminals, the conductors of said windings being so associated with each other and with said terminals that by changes of the coupling of said terminals the pole-numbers N and N/3 are obtained, and means for changing said coupling.

18. A multispeed alternating-current motor, provided with primary drum-windings having their conductors connected so as to form a plurality of groups, said groups being arranged in a plurality of branches provided with end terminals and a plurality of intermediate terminals, and means for changing the connections of said terminals to vary the direction of current-flow in the different groups and thereby change the number of poles.

19. A multispeed alternating-current motor, provided with primary drum-windings having their conductors connected so as to form a plurality of groups, said groups being arranged in two branches provided with end terminals and a plurality of intermediate terminals, and means for changing the connections of said terminals to vary the direction of current-flow in the groups to change the number of poles.

20. A multispeed alternating-current motor, provided with primary drum-windings having their conductors connected so as to form eight groups, said groups being arranged in two branches provided with two end terminals and three intermediate terminals per branch, and means for changing the connections of said terminals to vary the direction of current-flow in the groups and thereby change the number of poles.

21. A multispeed, three-phase alternating-current motor, provided with primary drum-windings having their conductors connected together in groups and provided with a maximum of ten terminals per phase, the conductors of said windings being so associated with each other and with said terminals that by changes of the couplings of said terminals the number of poles will be changed so as to give four speeds, and means for changing said couplings.

22. A multispeed, three-phase alternating-current motor provided with primary drum-windings having their conductors connected together in groups and provided with a maximum of ten terminals per phase, the conductors of said windings being so associated with each other and with said terminals that by changes of the couplings of said terminals the pole-numbers N' N/2, N/3 and N/4 are obtained, and means for changing said coupling.

23. A multispeed, alternating-current motor, provided with primary drum-windings having their conductors connected together in groups and provided with terminals, the conductors of said windings being so associated with each other and with said terminals that by changes of the coupling of said terminals the number of poles may be changed so as to give three speeds, and means for changing said coupling.

24. A multispeed, three-phase alternating-current motor provided with primary drum-windings having their conductors connected together in groups and provided with a maximum of twelve terminals, the conductors of said windings being so associated with each other and with said terminals that by changes of the coupling of said terminals the number of poles will be changed so as to give three speeds, and means for changing said coupling.

25. A multispeed, three-phase alternating-current motor provided with primary drum-windings having their conductors connected together in groups and provided with a maximum of twelve terminals, the conductors of said windings being so associated with each other and with said terminals that by changes of the coupling of said terminals the pole numbers N/2, N/3 and N/4 are obtained, and means for changing said coupling.

26. A multispeed, three-phase alternating-current motor having primary windings, the windings of each phase being divided into groups which are connected in a closed circuit, terminals in each of said circuits between said groups, the conductors of each phase of said windings being so associated with each other and with said terminals that by changes of coupling of the said terminals the number of poles of the motor may be changed so as to give three speeds.

27. A multispeed three-phase alternating-current motor having primary windings, the winding of each phase being provided with four terminals, the conductors of each phase-winding being so associated with each other and with said terminals that by changes of the coupling of said terminals the number of poles of the motor may be changed so as to give three speeds.

28. A winding for a three-speed alternating-current motor having its conductors connected so as to form a plurality of groups, in one of which the direction of current-flow is the same for all speeds of the motor and in the others of which the direction of current-flow is the same for two speeds and reversed for the other speed, and means for changing the relative connections of the several groups for the different speeds.

29. A phase-winding for a multispeed alternating-current motor, which consists of a plurality of coils having their conductors connected so as to form a plurality of groups connected in a closed circuit, terminals located in said circuit at points between said groups, and switching means for changing the direction of current-flow through said groups.

30. A polyphase-winding for a multispeed alternating-current motor, consisting of a plurality of phase-windings each of which consists of a plurality of coils having their conductors connected so as to form a plurality of groups connected in a closed circuit, terminals located in said closed circuits at points between said groups, and switching means for changing the direction of current-flow through said groups.

31. In a multispeed-motor, a distributed winding having each phase formed of uniform overlapping coils connected in groups, and means for varying the connections of said groups.

32. In a multispeed-motor, a distributed winding having each phase formed of uniform overlapping coils, and means for varying the relative directions of current-flow in said coils.

33. In a multispeed-motor, a distributed winding having each phase formed of uniform overlapping coils connected in groups, said groups being connected in a closed circuit, and means for varying the points of connection from said circuit to the source of current.

34. In a multispeed-motor, a distributed winding having each phase formed of uniform overlapping coils connected in four groups, said groups being connected in series in a closed circuit, and means for varying the points of connection from said closed circuit to the source of current.

35. In a multispeed-motor, a distributed winding for each phase of the motor, each coil of said winding being overlapped on each side by a coil connected in the same phase.

36. In a multispeed-motor, a distributed winding for each phase of the motor, each coil of said winding being overlapped for one-third its width on each side by a coil connected in the same phase.

37. In a multispeed-motor, a slotted core, a winding arranged with three coils in each slot, said coils being connected in different phases to form a three-phase winding and the coils of each phase being connected in groups, and means for varying the connections of the groups to produce different pole-numbers.

38. In a multispeed-motor, a slotted core, a winding arranged with three coils in each slot, said coils being connected in different phases to form a three-phase winding and the coils of each phase being connected in groups, and means for connecting said groups for different pole-numbers.

39. In a multispeed-motor, a slotted core, a three-phase winding carried in said slots, each phase being composed of uniform overlapping coils connected in groups and each slot containing three coils connected one in each phase, and means for varying the connections of the groups of each phase to connect the winding for different pole-numbers.

40. In a multispeed-motor, a slotted core, a three-phase winding carried in said slots, each phase being composed of uniform coils connected in groups and each slot containing three coils connected one in each phase, and means for varying the connections of the groups of each phase.

41. A winding for a multispeed alternating-current motor having the conductors of each phase connected in three or more groups, all the conductors in which the relative directions of current-flow are the same for all speeds of the motor being connected in the same group so that the number of poles of the motor may be varied by a simple change of coupling of the groups.

42. In a multispeed-motor, a winding having its conductors connected in a plurality of groups, said conductors being so arranged that by reversing the relative terminal connections of one or more groups a second speed may be obtained and by reversing the relative terminal connections of one or more other groups a third speed may be obtained.

In witness whereof I have hereunto set my hand this 3d day of July, 1903.

ERNST F. W. ALEXANDERSON.

Witnesses:
 BENJAMIN B. HULL,
 HELEN ORFORD.